US 8,258,921 B2

(12) United States Patent
Hashiguchi et al.

(10) Patent No.: US 8,258,921 B2
(45) Date of Patent: Sep. 4, 2012

(54) ELECTRONIC SHELF LABEL SYSTEM

(75) Inventors: Nobuki Hashiguchi, Shiga (JP);
Shigemitsu Mizukawa, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 767 days.

(21) Appl. No.: 12/302,992

(22) PCT Filed: Apr. 25, 2008

(86) PCT No.: PCT/JP2008/058102
§ 371 (c)(1),
(2), (4) Date: Dec. 1, 2008

(87) PCT Pub. No.: WO2008/149621
PCT Pub. Date: Dec. 11, 2008

(65) Prior Publication Data
US 2010/0253472 A1    Oct. 7, 2010

(30) Foreign Application Priority Data
Jun. 1, 2007  (JP) ................................ 2007-146951

(51) Int. Cl.
*G05B 19/00* (2006.01)
*G05B 23/00* (2006.01)
*G06F 7/00* (2006.01)
*G08B 29/00* (2006.01)
*G08C 19/00* (2006.01)
*H04B 1/00* (2006.01)
*H04Q 3/00* (2006.01)
*H04Q 9/00* (2006.01)
*G08B 19/00* (2006.01)

(52) U.S. Cl. ...................................... 340/5.91; 340/522
(58) Field of Classification Search .................. 340/5.91
See application file for complete search history.

(56) References Cited

U.S. PATENT DOCUMENTS
5,544,041 A    8/1996    Nekomoto
(Continued)

FOREIGN PATENT DOCUMENTS
JP    8-503796    4/1996
(Continued)

OTHER PUBLICATIONS
International Search Report in PCT /JP2008/058102, mailed Aug. 5, 2008.
(Continued)

*Primary Examiner* — Benjamin C Lee
*Assistant Examiner* — Cal Eustaquio
(74) *Attorney, Agent, or Firm* — Staas & Halsey LLP

(57) ABSTRACT

It is an object of the present invention to provide a technique relating to an electronic shelf label system that is capable of suppressing malfunction of an electronic shelf label caused by the increase of internal resistance of a battery. In order to achieve this object, in an electronic shelf label system of the present invention, an electronic shelf label 5 includes a battery 56 for supplying power of this electronic shelf label 5, a to-be-charged part 572 to be charged by power supplied from the battery 56, a light emission part 52 for sending data to a distribution device by using power accumulated in the to-be-charged part 572, and a boost circuit 571 and a control circuit 570 for controlling power supplied from the battery 56 to the to-be-charged part 572. In the electronic shelf label 5, on receipt of change notification data from the distribution device, a charge operation mode of this electronic shelf label 5 is changed from a normal charge mode to a long-term charge mode in which the to-be-charged part 572 is charged in a period of time longer than that in the normal charge mode. Power supplied from the battery 56 to the to-be-charged part 572 is lower in the long-term charge mode than in the normal charge mode.

8 Claims, 12 Drawing Sheets

U.S. PATENT DOCUMENTS

| | | | |
|---|---|---|---|
| 2002/0002421 A1* | 1/2002 | Murofushi | 700/214 |
| 2002/0065454 A1* | 5/2002 | Lebel et al. | 600/365 |
| 2004/0008121 A1* | 1/2004 | Giannopoulos et al. | 340/686.1 |
| 2005/0040792 A1* | 2/2005 | Nair | 320/162 |
| 2007/0040825 A1* | 2/2007 | Mamba et al. | 345/211 |
| 2007/0115126 A1* | 5/2007 | Harkins | 340/572.1 |
| 2008/0079538 A1* | 4/2008 | Davis | 340/5.91 |

FOREIGN PATENT DOCUMENTS

| | | |
|---|---|---|
| JP | 10-73866 | 3/1998 |
| JP | 11-316878 | 11/1999 |
| JP | 2001-5872 | 1/2001 |
| JP | 2002-516430 | 6/2002 |
| JP | 2003-189485 | 7/2003 |
| JP | 2006-109995 | 4/2006 |
| JP | 2007-111137 | 5/2007 |
| WO | WO/99/60473 | 11/1999 |

OTHER PUBLICATIONS

Patent Abstracts of Japan, Publication date Jan. 12, 2001, Publication No. 2001-005872.

Patent Abstracts of Japan, Publication date Jul. 4, 2003, Publication No. 2003-189485.

Patent Abstracts of Japan, Publication date Mar. 17, 1998, Publication No. 10-073866.

Search Report issued by the European Patent Office on May 8, 2012 in the corresponding European patent application.

* cited by examiner

F I G . 2
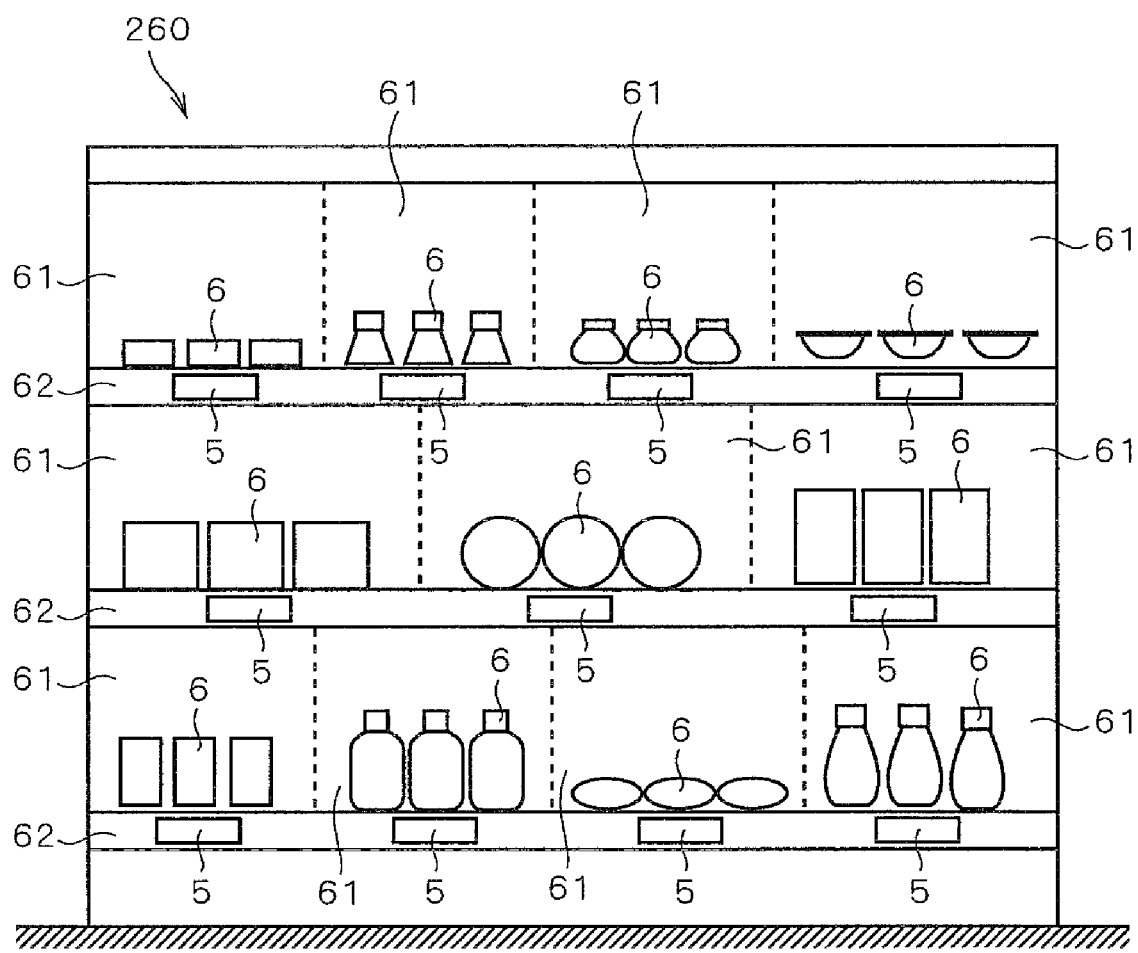

FIG. 5

| PRODUCT CODE | PRODUCT NAME | NORMAL PRICE | BARGAIN PRICE | PERIOD OF SPECIAL SALE | ... | DEVICE CODE |
|---|---|---|---|---|---|---|
| ... | ... | ... | ... | ... | ... | ... |
| 49123401 | XX BEEF FILLET STEAK | 1660 | 1280 | FROM DATE X, TIME X TO DATE Y, TIME Y | ... | 34500 |
| 49123432 | OX TONGUE FOR GRILLING | 980 | 498 | FROM DATE X, TIME X TO DATE Y, TIME Y | ... | 34501 |
| ... | ... | ... | ... | ... | ... | ... |

101

102 — 49123401
102 — 49123432

F I G . 8
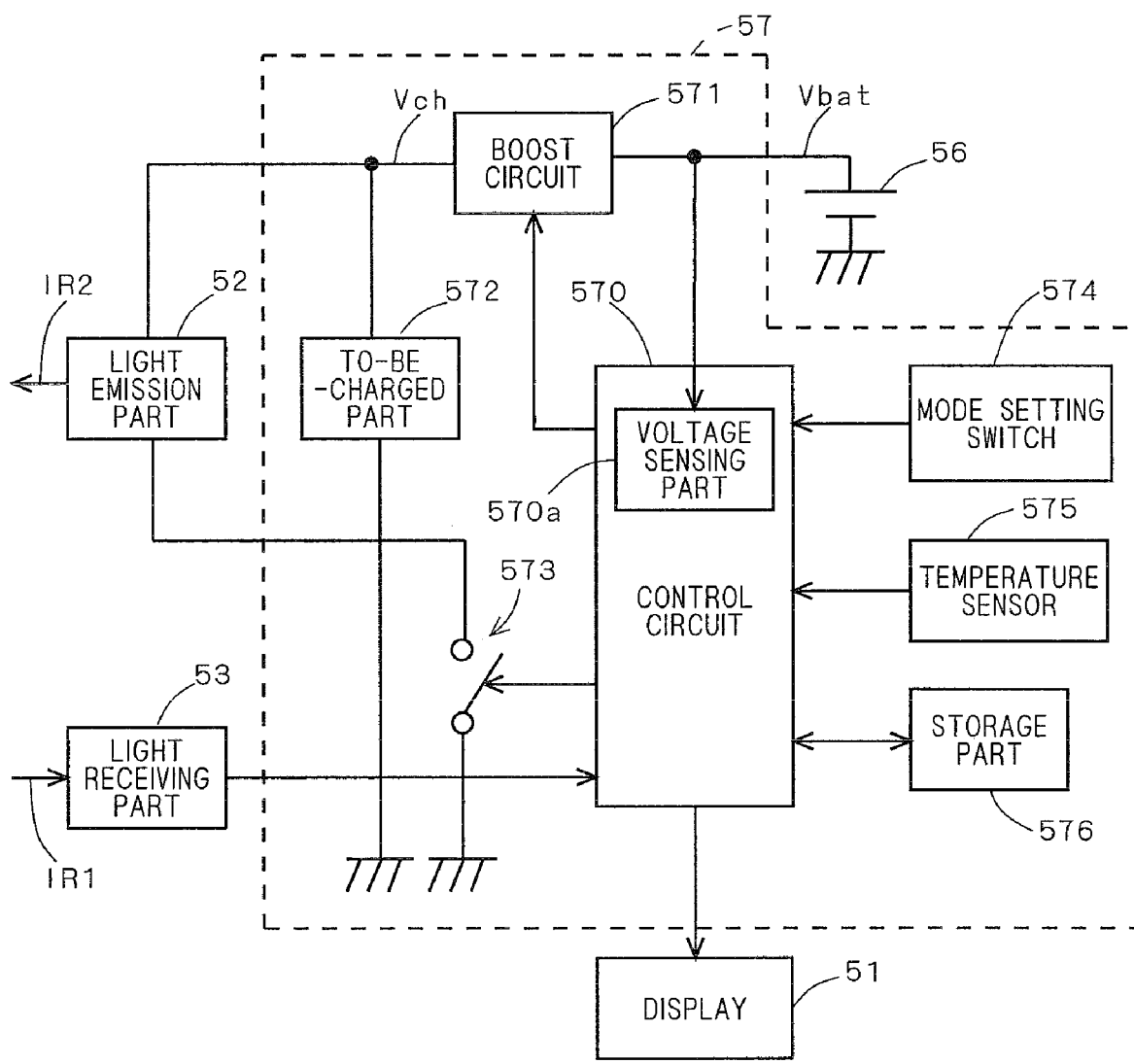

ELECTRONIC SHELF LABEL SYSTEM

CROSS REFERENCE TO RELATED PATENT APPLICATIONS

This application claims the benefit under 35 U.S.C. Section 371, of International Application No. PCT/JP2008/058102, filed Apr. 25, 2008, which claimed priority to Japanese Application No. 2007-146951, filed Jun. 1, 2007, in the Japanese Patent Office, the disclosures of all of which are hereby incorporated by reference.

TECHNICAL FIELD

The present invention relates to an electronic shelf label system with a plurality of electronic shelf labels arranged in corresponding relation to products, and displaying product data relating to the corresponding products.

BACKGROUND ART

Generally, in stores like supermarkets or convenience stores, selling prices of products in the stores are controlled collectively by a product master stored in a POS system and the like. Meanwhile, in many cases, a customer (consumer) is informed of selling prices by shelf labels formed from paper media arranged, in the positions of products. When such shelf labels of paper media are employed, the shelf labels should be controlled manually. In this case, human errors such as mistakes in selling prices are likely to occur. As a result, a customer may be informed of an incorrect selling price different from that at the time of payment by a cash register of a POS system.

In order to solve this problem, an ESL system (electronic shelf label system) has been put into active use in recent years as disclosed in Patent Documents 1 and 2. In the electronic shelf label system, a portable electronic shelf label for displaying product data relating to a product such as data indicative of a selling price is arranged in corresponding relation to each product. A communication signal containing data indicative of a selling price which is based on a product master is output from a distribution device for distributing information to each electronic shelf label. Then the selling price is displayed on each electronic shelf label. As a result, a correct selling price coinciding with a selling price at the time of payment is displayed on an electronic shelf label, by which a customer is informed of the correct selling price.

Patent Document 3 discloses a technique relating to a portable device, and Patent Document 4 discloses a technique relating to a camera.

Patent Document 1: Japanese Patent Publication No. 2002-516430

Patent Document 2: Japanese Patent Application Laid-Open No. 2001-5872

Patent Document 3: Japanese Patent Application Laid-Open No. 2003-189485

Patent Document 4: Japanese Patent Application Laid-Open No. 10-73866

As disclosed in Patent Document 1 cited above, in an electronic shelf label, generally, a to-be-charged part formed from a capacitor is charged by power supplied from a battery, and a transmission part formed from an LED sends data to a higher-order distribution device by using power given to the to-be-charged part. The internal resistance of a battery normally increases during operation in a low-temperature environment, or on the occurrence of performance degradation generated by change over time and the like. In a condition where the internal resistance is on the increase, the supply of a large amount of power from the battery to the to-be-charged part causes the output voltage of the battery to drop, so the electronic shelf label may not be in normal operation.

DISCLOSURE OF INVENTION

The present invention has been made in view of the foregoing. It is an object of the present invention to provide a technique relating to an electronic shelf label system that is capable of suppressing malfunction of an electronic shelf label caused by the increase of internal resistance of a battery.

In order to solve this problem, in a first aspect of the electronic shelf label system of this invention, an electronic shelf label system includes a plurality of electronic shelf labels arranged in corresponding relation to products, and displaying product data relating to corresponding products; and an information distribution part for making communication with the plurality of electronic shelf labels to distribute the product data to each of the plurality of electronic shelf labels on which the product data should be displayed. Each of the plurality of electronic shelf labels includes: a battery for supplying power of this electronic shelf label; a to-be-charged part to be charged by power supplied from the battery; a transmission part for sending data to the information distribution part by using power accumulated in the to-be-charged part; and a charge control part for controlling power supplied from the battery to the to-be-charged part. In each of the plurality of electronic shelf labels, on receipt of certain data from the information distribution part, a charge operation mode of this electronic shelf label is changed from a first mode in which the to-be-charged part is charged in a first period of time to a second mode in which the to-be-charged part is charged in a second period of time longer than the first period of time. Power supplied from the battery to the to-be-charged part is lower in the second mode than in the first mode.

According to a second aspect of the electronic shelf label system of this invention, in the first aspect, the charge control part includes a boost circuit for boosting the voltage of the battery and supplying the voltage to the to-be-charged part, and power is supplied from the battery through the boost circuit to the to-be-charged part.

According to a third aspect of the electronic shelf label system of this invention, in the first or second aspect, the information distribution part determines whether or not the information distribution part should send the certain data to the electronic shelf label based on the location of this electronic shelf label.

According to a fourth aspect of the electronic shelf label system of this invention, in the first or second aspect, the information distribution part determines whether or not the information distribution part should send the certain data to the electronic shelf label based on the number of communications with this electronic shelf label.

According to a fifth aspect of the electronic shelf label system of this invention, in the first or second aspect, the information distribution part determines whether or not the information distribution part should send the certain data to the electronic shelf label based on the operating period of this electronic shelf label from a certain point in time.

According to a sixth aspect of the electronic shelf label system of this invention, in any one of the first to fifth aspects, each of the plurality of electronic shelf labels further includes a mode setting switch, and each of the plurality of electronic shelf labels switches the charge operation mode in response to the condition of the mode setting switch.

According to a seventh aspect of the electronic shelf label system of this invention, in any one of the first to fifth aspects, each of the plurality of electronic shelf labels further includes a temperature sensor for sensing the temperature of this electronic shelf label, and each of the plurality of electronic shelf labels switches the charge operation mode in response to a result of sensing at the temperature sensor.

According to an eighth aspect of the electronic shelf label system of this invention, in any one of the first to fifth aspects, each of the plurality of electronic shelf labels further includes a voltage sensing part for sensing the voltage of the battery, and each of the plurality of electronic shelf labels switches the charge operation mode in response to a result of sensing at the voltage sensing part.

According to the first aspect of the electronic shelf label system of this invention, in each of the plurality of electronic shelf labels, on receipt of the certain data from the information distribution part, the charge operation mode of this electronic shelf label is changed from the first mode in which the to-be-charged part is charged in the first period of time to the second mode in which the to-be-charged part is charged in the second period of time longer than the first period of time. Power supplied from the battery to the to-be-charged part is lower in the second mode than in the first mode. Thus, in response for example to a case where the internal resistance of the battery increases due to operation in a low-temperature environment or performance degradation of this battery, power supplied from the battery to the to-be-charged part is reduced and the to-be-charged part is charged in a longer period of time under instructions from the information distribution part. This suppresses reduction of the voltage of the battery caused by the increase of the internal resistance of the battery, while maintaining power supplied to the transmission part. As a result, malfunctions of the electronic shelf labels are suppressed while transmission performance is maintained.

According to the second aspect of the electronic shelf label system of this invention, power is supplied from the battery through the boost circuit to the to-be-charged part. When power from the battery is supplied to the to-be-charged part through the boost circuit, higher power should be taken out of the battery, causing the voltage of the battery to easily drop during operation in a low-temperature environment or on the occurrence of performance degradation of this battery. The present invention may be effectively applied especially in this case.

According to the third aspect of the electronic shelf label system of this invention, the information distribution part determines whether or not the information distribution part should send the certain data to the electronic shelf label based on the location of this electronic shelf label. When the electronic shelf label is arranged at a place in low ambient temperature such as a refrigerator area or a freezer area in a store, the information distribution part sends the certain data to this electronic shelf label to change the charge operation mode of this electronic shelf label. It is thus possible to properly suppress the reduction of the voltage of the battery caused by the increase of internal resistance during operation in a low-temperature environment.

According to the fourth aspect of the electronic shelf label system of this invention, the information distribution part determines whether or not the information distribution part should send the certain data to the electronic shelf label based on the number of communications with this electronic shelf label. Thus the information distribution part sends the certain data to the electronic shelf label at a timing at which performance degradation is assumed to be generated in the battery of this electronic shelf label, thereby changing the charge operation mode of this electronic shelf label. It is thus possible to properly suppress the reduction of the voltage of the battery caused by the increase of internal resistance on the occurrence of performance degradation.

According to the fifth aspect of the electronic shelf label system of this invention, the information distribution part determines whether or not the information distribution part should send the certain data to the electronic shelf label based on the operating period of this electronic shelf label from a certain point in time. Thus the information distribution part sends the certain data to the electronic shelf label at a point in time at which performance degradation is assumed to be generated in the battery of this electronic shelf label, thereby changing the charge operation mode of this electronic shelf label. It is thus possible to properly suppress the reduction of the voltage of the battery caused by the increase of internal resistance on the occurrence of performance degradation.

According to the sixth aspect of the electronic shelf label system of this invention, the electronic shelf label is allowed to switch its charge operation mode, not only by receiving instructions from the information distribution part, but also by the electronic shelf label alone.

According to the seventh aspect of the electronic shelf label system of this invention, the electronic shelf label is allowed to switch its charge operation mode, not only by receiving instructions from the information distribution part, but also by the electronic shelf label alone. Further, the charge operation mode is reliably switched to the second mode during operation of the battery in a low-temperature environment.

According to the eighth aspect of the electronic shelf label system of this invention, the electronic shelf label is allowed to switch its charge operation mode, not only by receiving instructions from the information distribution part, but also by the electronic shelf label alone. Further, the charge operation mode is reliably switched to the second mode when the performance degradation of the battery is generated to cause voltage drop of this battery.

These and other objects, features, aspects and advantages will become more apparent from the following detailed description of the present invention when taken in conjunction with the accompanying drawings.

BRIEF DESCRIPTION OF DRAWINGS

FIG. 2 shows a state in which electronic shelf labels of the electronic shelf label system according to the embodiment of the present invention are arranged;

FIG. 5 shows an example of a product file;

FIG. 8 is a block diagram showing the configuration of a control part of the electronic shelf label according to the embodiment of the present invention;

BEST MODE FOR CARRYING OUT THE INVENTION

Figure 1:
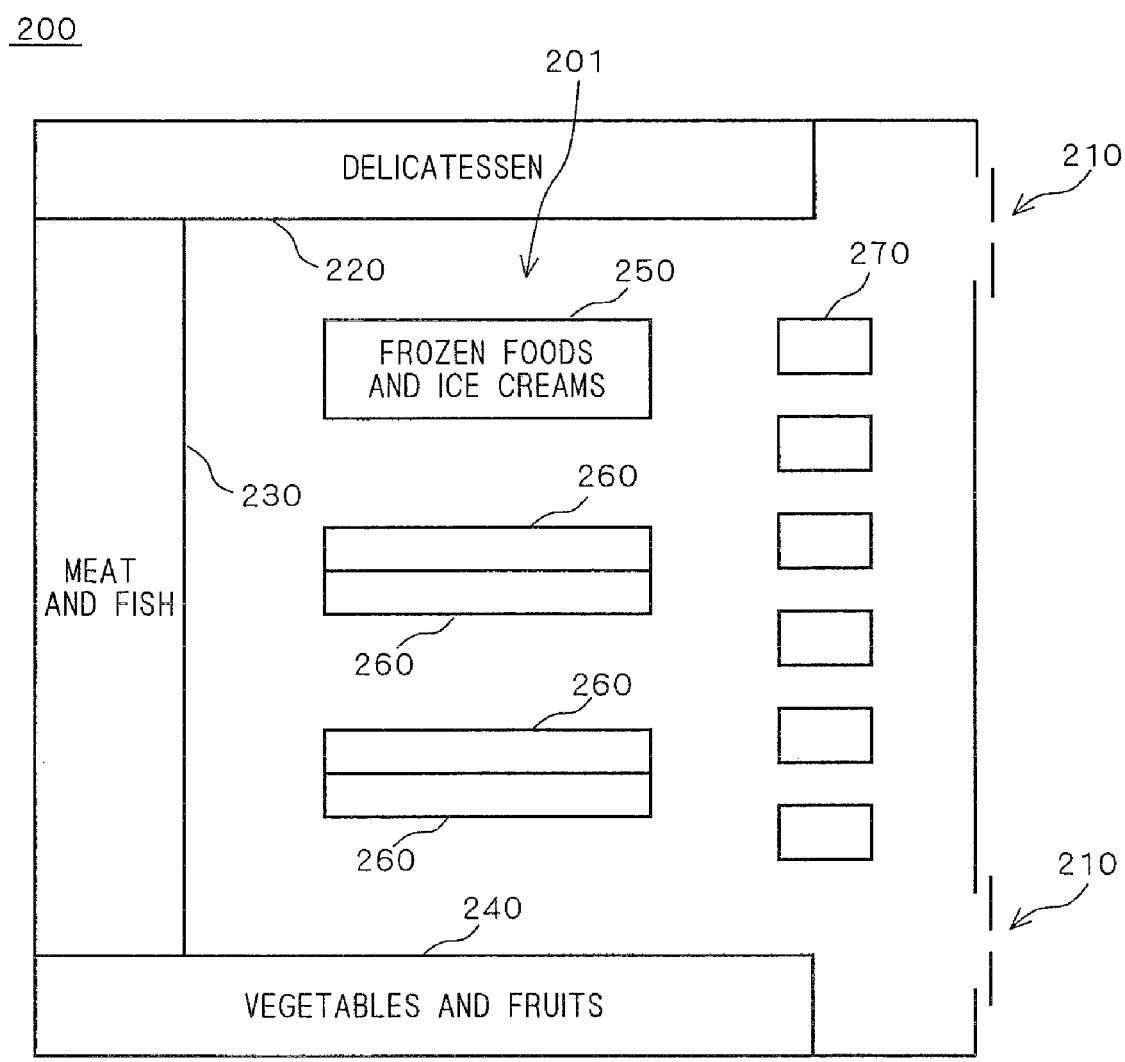
FIG. 1 is a plan view showing an exemplary state of a store into which an electronic shelf label system according to an embodiment of the present invention is implemented.

FIG. 1 is a plan view showing an exemplary state of a store 200 into which an electronic shelf label system 1 according to a present embodiment is implemented. In the electronic shelf label system 1, a portable electronic shelf label for displaying product data relating to a product such as data indicative of a selling price is arranged in corresponding relation to each product. A communication signal containing data indicative of a selling price which is based on a product master is output from a distribution device for distributing information to each electronic shelf label. Then the selling price is displayed on each electronic shelf label. As a result, a correct selling price coinciding with a selling price at the time of payment is displayed on an electronic shelf label, by which a customer is informed of the correct selling price.

As shown in FIG. 1, the store 200 has two doorways 210. In a sales space 201 in the store 200, a plurality of cash registers 270 are arranged near the doorways 210. Also arranged in the sales space 201 are a showcase 220 in which delicatessen is placed, a showcase 230 in which meat and fish are placed, a showcase 240 in which vegetables and fruits are placed, a showcase 250 in which frozen foods and ice creams are placed, and a plurality of product shelves 260 in which sweets, everyday items and others are placed. Electronic shelf labels are attached to the showcases 220 to 250, and the product shelves 260. The store 200 also has a back room not shown intended for the storage of stocked products and the like.

FIG. 2 shows a state in which electronic shelf labels 5 are arranged in the store 200. In FIG. 2, as an example, the electronic shelf labels 5 are shown to be arranged in the product shelf 260. As shown in FIG. 2, the product shelf 260 is divided into spaces called faces 61, and products 6 of the same type are collected and placed in each face 61. Frames 62 of the product shelf 260 are given the electronic shelve labels 5 attached thereto that are arranged in the positions corresponding to the respective faces 61. That is, the electronic shelf labels 5 are each associated with one product 6 (namely, one type of product), and are arranged on the frames 62 near the corresponding products 6 (generally under the products 6). Each electronic shelf label 5 has a display on which a selling price of the corresponding product 6 is displayed. A customer (consumer) of the store 200 recognizes the selling price of the product 6 by such display on the electronic shelf label 5. The electronic shelf labels 5 are portable devices, and can be detached from the frames 62 to be rearranged in other positions in order to respond to the change of arrangement of the products 6.

Figure 3:
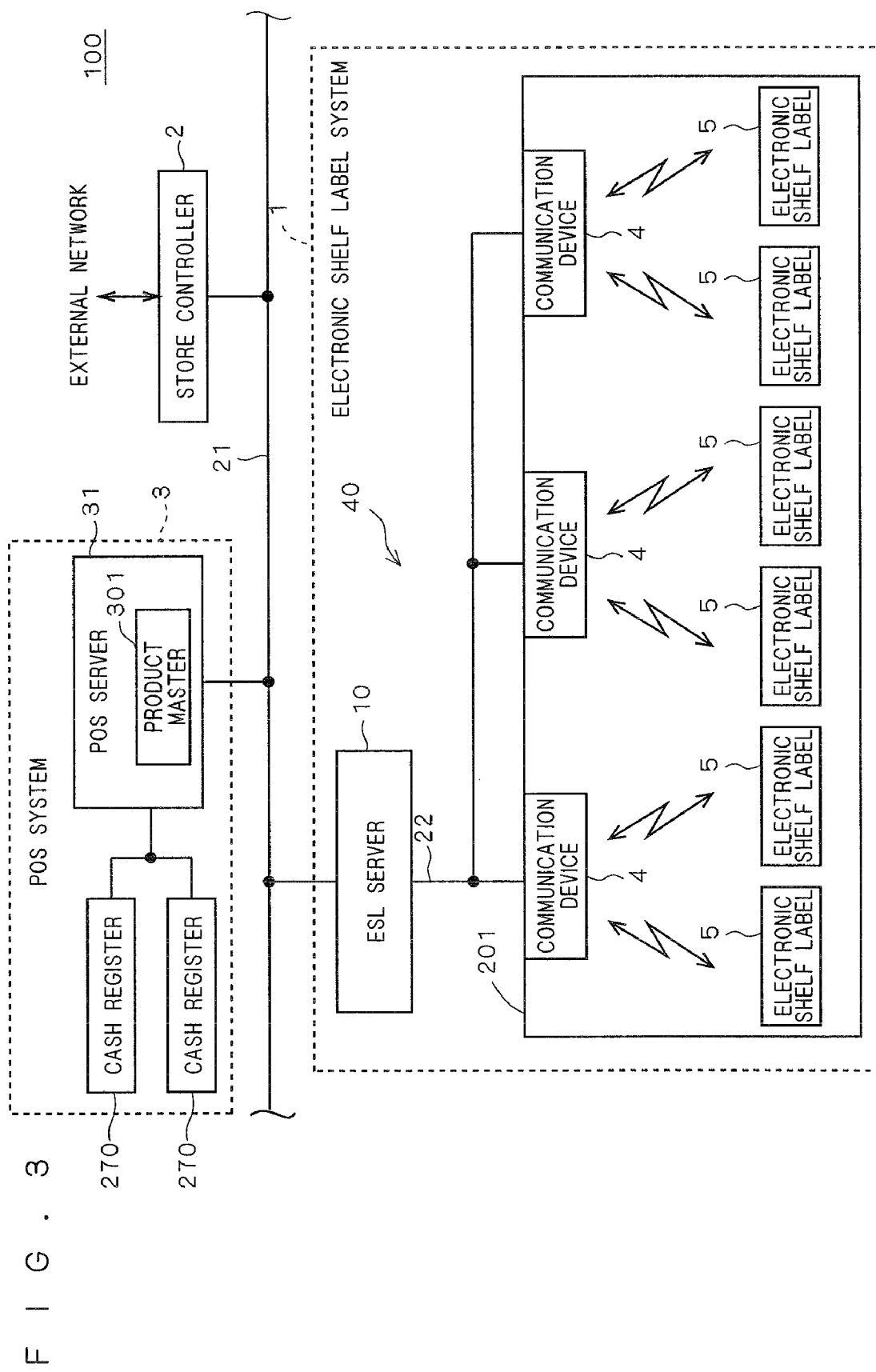
FIG. 3 shows an exemplary configuration of a store information system that includes the electronic shelf label system according to the embodiment of the present invention.

FIG. 3 shows an exemplary configuration of a store information system 100 that includes the electronic shelf label system 1 and is applied to the store 200. As shown in FIG. 3, the store information system 100 includes a store controller 2 and a POS system 3 as well as the electronic shelf label system 1. A POS server 31 of the POS system 3 and an ESL server 10 of the electronic shelf label system 1 are connected through a LAN 21 to the store controller 2, by which data communication is realized between the store controller 2, the POS system 3 and the electronic shelf label system 1.

The store controller 2 is formed from a generally-used computer, and is operative to serve as a device responsible for the overall control of the store information system 100. The store controller 2 is connected to an external network such as the Internet. The store controller 2 is capable of communicating through the external network with a computer such as a server that is placed in a head office responsible for the overall control of the store 200.

The POS system 3 is a system for collecting and analyzing information relating to the sale of a product at a time when the product is sold. The POS system 3 includes the POS server 31 responsible for the overall control of the POS system 3, and the above-discussed plurality of cash registers 270 responsible for the payment of products. The POS server 31 and the cash registers 270 are connected through a dedicated cable.

The POS server 31 is formed from a generally-used computer. A product master 301 indicative of various types of information relating to products such as selling prices is stored in a hard disk of the POS server 31. The plurality of cash registers 270 each handle payment of products based on selling prices recorded on the product master 301.

Information relating to all products in the store 200 are collectively controlled by the product master 301. Information recorded on the product master 301 includes "product codes" as identifying information of products, "product names" as names of products, "normal prices" as normal selling prices, "bargain prices" as selling prices at special sale, "period of special sale" as a period in which special sale is held, and the like.

The electronic shelf label system 1 is divided broadly into the plurality of electronic shelf labels 5 as discussed above, and a distribution device 40 for distributing selling prices and the like to be displayed on the electronic shelf labels 5.

The distribution device 40 as an information distribution part includes the ESL server 10 responsible for the overall control of the electronic shelf label system 1, and a plurality of communication devices 4. The ESL server 10 and the plurality of communication devices 4 are connected to each other through a dedicated communication cable 22, thereby realizing data communication therebetween. Each of the communication devices 4 conducts infrared communication with the electronic shelf labels 5. The communication devices 4 are substantially equally spaced on the ceiling of the sales space 201, for example, so that the communication devices 4 are allowed to conduct communications with all the electronic shelf labels 5 arranged in the sales space 201.

Figure 4:
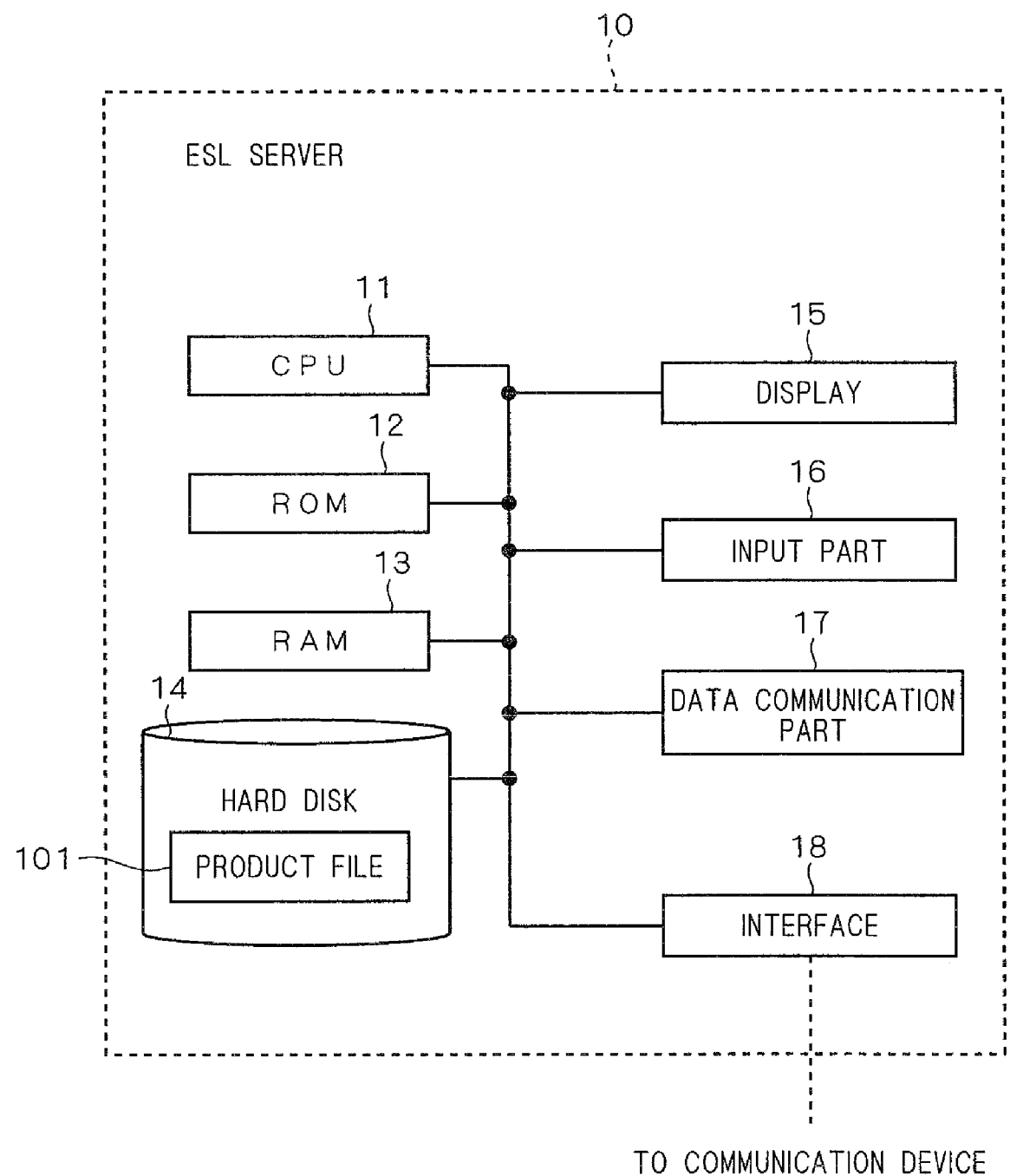
FIG. 4 shows the configuration of an ESL server according to the embodiment of the present invention.

The ELS server 10 has the same hardware configuration as that of a generally-used computer. FIG. 4 shows the configuration of the ESL server 10. The ESL server 10 includes a CPU 11 responsible for various computations, a ROM 12 for storing a basic program, a RAM 13 as a working area for computations, a hard disk 14 for storing programs and various data files, a display 15 for various types of displays, an input part 16 formed from a keyboard, a mouse and the like, a data communication part 17 given a communication facility through the LAN 21, and an interface 18 for making communication with the communication devices 4. Signals indicative of selling prices to be sent to the electronic shelf labels 5 are given through the interface 18 to the communication devices 4.

A dedicated program is stored in advance in the hard disk 14 of the ESL server 10. The CPU 11 performs computations based on this program to achieve various functions of the ESL server 10. A product file 101 as a data file indicative of various types of information relating to products is stored in the hard disk 14 of the ESL server 10.

FIG. 5 shows an example of the product file 101. As shown in FIG. 5, the product file 101 is in the form of a table, and each record 102 indicates information relating to one product. More specifically, "product code", "product name", "normal price", "bargain price", "period of special sale" are registered in each record 102. These pieces of information are the same as those of the product master 301 stored in the POS system 3 discussed above, and are registered based on the information in the product master 301 through the communication between the ESL server 10 and the POS system 3. Accordingly, the contents of the information in the product file 101 coincide with those of the information in the product master 301.

Each record 102 in the product file 101 is also given a "device code" as a hardware ID unique to each of the plurality of electronic shelf labels 5 of the electronic shelf label system 1, by which a product and the electronic shelf label 5 are associated (linked) in one-to-one relation in the form of data. The use of this device code causes a selling price of a product to be sent to the electronic shelf label 5 corresponding to this product.

The ESL server 10 with the configuration discussed so far generates transmission data to be sent to each electronic shelf label 5 in the CPU 11, and outputs the transmission data through the interface 18 to each communication device 4. Each communication device 4 outputs a communication signal containing the received transmission data to each electronic shelf label 5 with which the communication device 4 is capable of making communication. Thereby, the same transmission data is input to each of the electronic shelf labels 5 located on the sales space 201 from the distribution device 40. The transmission data to be sent from the ESL server 10 contains product data such as normal prices and bargain prices, and device codes that are stored in the product file 101.

Figure 6:
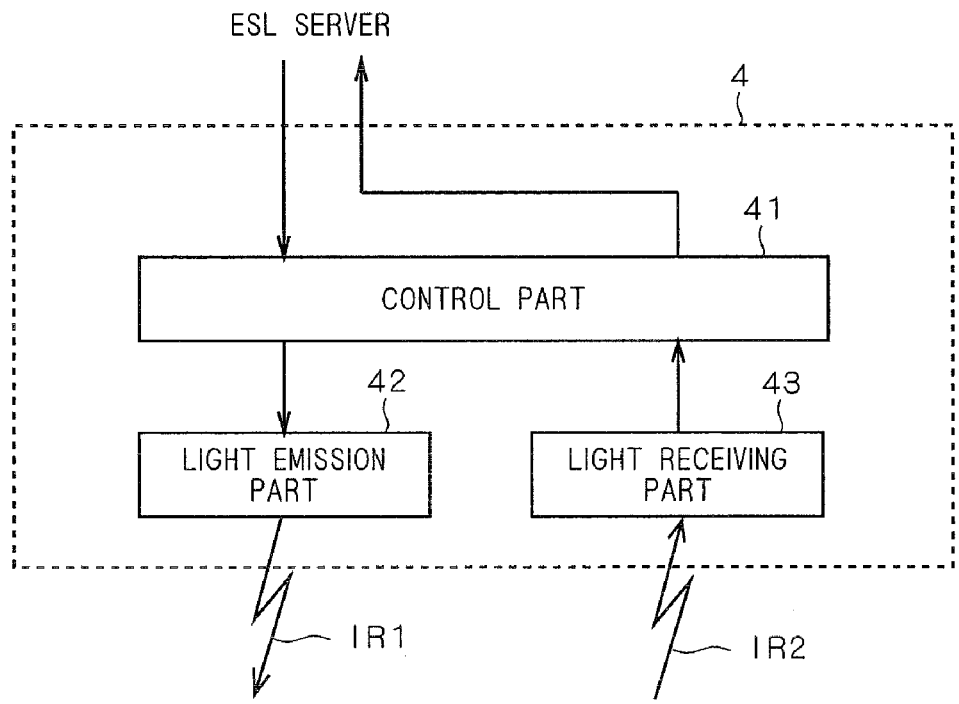
FIG. 6 shows the configuration of a communication device according to the embodiment of the present invention.

Next, the configuration of the communication devices 4 is discussed in detail. FIG. 6 shows the configuration of the communication devices 4. As shown in FIG. 6, each communication device 4 includes a control part 41, a light emission part 42 formed for example from an LED, and a light receiving part 43 formed for example from a photodiode and an amplifier.

The control part 41 controls the light emission part 42 based on transmission data input from the ESL server 10, thereby outputting an infrared signal IR1 modulated by the transmission data.

The light receiving part 43 receives an infrared signal IR2 output from the electronic shelf label 5. The infrared signal 1R2 is modulated by transmission data from the electronic shelf label 5 to the ESL server 10. The light receiving part 43 converts the received infrared signal IR2 into an electronic signal, and outputs the same to the control part 41. The control part 41 performs detection and the like on the electronic signal input from the light receiving part 43 to reproduce the transmission data generated in the electronic shelf label 5. Then the control part 41 outputs the reproduced transmission data to the ESL server 10. The transmission data from the electronic shelf label 5 is also encoded. The ESL server 10 decodes transmission data received from the communication device 4.

Figure 7:
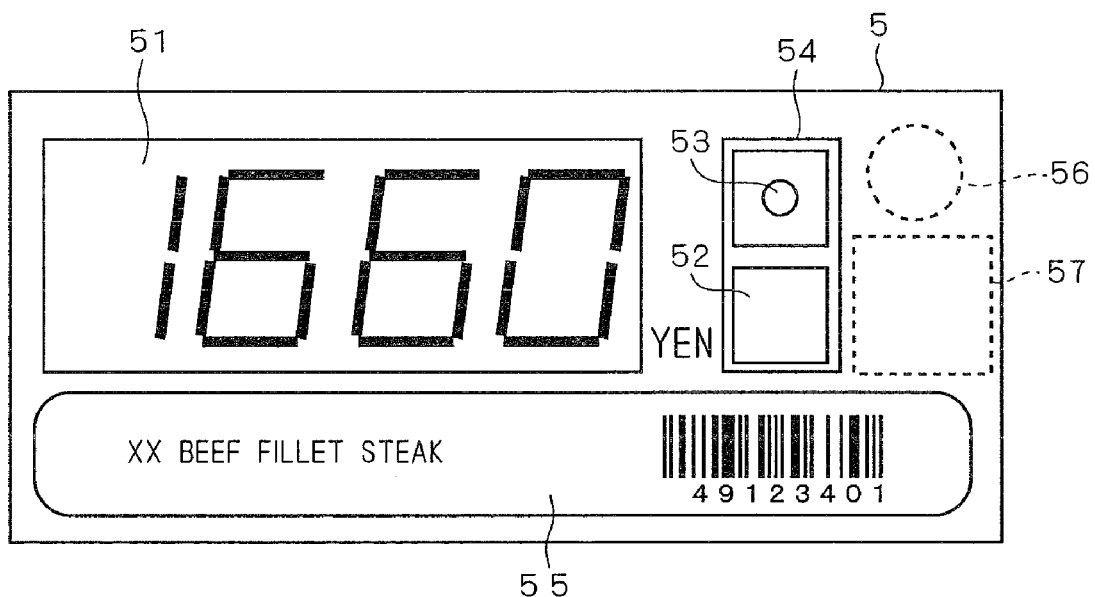
FIG. 7 shows the configuration of the electronic shelf label according to the embodiment of the present invention.

Next, the configuration of the electronic shelf label 5 is discussed in detail. FIG. 7 shows the configuration of the electronic shelf label 5. As shown in FIG. 7, a display 51 for displaying a selling price of a product, and a communication part 54 responsible for the communication with the distribution device 40 are arranged on the front face of the electronic shelf label 5. The display 51 is a dot-matrix display device, and is formed for example from an electronic paper.

The communication part 54 includes a light emission part 52 for emitting the infrared signal IR2, and a light receiving part 53 for receiving the infrared IR1 from the communication device 4, converting the same into an electronic signal, and outputting the same. The light emission part 52 operative to serve as a transmission part responsible for data transmission is formed for example from an LED, and the light receiving part 53 operative to serve as a receiving part responsible for the receipt of data is formed for example from a photodiode and an amplifier.

There is provided an overlay label 55 affixed below the display 51, and a "product name" and a bar code indicative of a "product code", which are relating to a product with which the electronic shelf label 5 is associated, are printed on the overlay label 55. It is difficult to see with which product the electronic shelf label 5 is associated if the electronic shelf label 5 has no label affixed thereto. The overlay label 55 visually associates the electronic shelf label 5 and a product. Instead of using the overlay label 55, information indicated on this overlay label 55 may be displayed on the display 51.

Provided in the electronic shelf label 5 is a small battery 56 for supplying power of the electronic shelf label 5. Also provided in the electronic shelf label 5 is a control part 57 responsible for the overall control of the operation of this electronic shelf label 5. FIG. 8 is a block diagram showing the configuration of the control part 57. As shown in FIG. 8, the control part 57 includes a control circuit 570, a boost circuit 571, a to-be-charged circuit 572, a light emission control switch 573, a mode setting switch 574, a temperature sensor 575, and a storage part 576.

The control circuit 570 is formed from a CPU and the like, and is responsible for the overall control of the operation of the control part 57. The control circuit 570 is provided therein with a voltage sensing part 570a for sensing a voltage Vbat output from the battery 56. The boost circuit 571 is for example a charge pump type boost circuit. The boost circuit 571 boosts the voltage Vbat output from the battery 56, and supplies the same as a boosted voltage Vch to the to-be-charged part 572 and the light emission part 52. The to-be-charged part 572 is formed from a capacitive element, and is charged by power supplied from the battery 56 through the boost circuit 571. The light emission control switch 573 is a circuit for controlling the light emission at the light emission part 52, and is formed for example from a MOS transistor. The operation of the light emission control switch 573 is controlled by the control circuit 570. When the light emission control switch 573 is brought to ON state, power accumulated in the to-be-charged part 572 is supplied to the light emission part 52 to generate the flow of a forward current in the LED constituting the light emission part 52. As a result, the light emission part 52 emits light. When the light emission control switch 573 is in OFF state, power accumulated in the to-be-charged part 572 is not supplied to the light emission part 52. Thus a forward current does not flow in the LED constituting the light emission part 52. As a result, the light emission part 52 does not emit light in this case.

In the electronic shelf label 5 of the present embodiment, power supplied from the battery 56 to the to-be-charged part 572 can be controlled by the control circuit 570 and the boost circuit 571. The operation mode of the boost circuit 571 includes a charge mode in which a charging current is supplied to the to-be-charged part 572, and a shutdown mode in which a charging current is not supplied to the to-be-charged part 572. In the charge mode, the internal resistance of the boost circuit 571 may vary for example in two stages. In the boost circuit 571, a switching frequency at the time of charging an internal capacitor varies with the variation of this internal resistance. A charging current supplied from the boost circuit 571 to the to-be-charged part 572 varies with the variation of the switching frequency of the boost circuit 571. As a result, power supplied from the battery 56 to the to-be-charged part 572 varies. The control circuit 570 switches the internal resistance and the operation mode of the boost circuit 571.

As discussed, in the electronic shelf labels of the present embodiment, the control circuit 570 and the boost circuit 571 are operative to serve as a charge control part for controlling the charging of the to-be-charged part 572. This charge control part realizes the control of power supplied from the battery 56 to the to-be-charged part 572 in three stages including the shutdown mode.

The mode setting switch 574 is a circuit for setting the operation mode of the electronic shelf label 5 for charging the to-be-charged part 572, and is formed for example by a DIP switch capable of being operated by a user. As discussed later, in the electronic shelf label 5 of the present embodiment, the operation mode for charging the to-be-charged part 572 (hereinafter referred to as a "charge operation mode") includes a normal charge mode and a long-term charge mode. In the electronic shelf label 5, one of these charge operation modes is selected in response to the condition of the mode setting switch 574. As an example, the normal charge mode is selected when the mode setting switch 574 is in OFF state. The long-term charge mode is selected when the mode setting switch 574 is in ON state.

The temperature sensor 575 measures the temperature of the electronic shelf label 5 to which the temperature sensor 575 belongs, and outputs a result of measurement to the control circuit 570. The storage part 576 is for example a non-volatile memory. Data indicative of a device code of a device to which the storage part 576 belongs, and an operation program executed by the CPU of the control circuit 570 are stored in advance in the storage part 576.

The voltage Vbat output from the battery 56 is supplied to the control circuit 570, the temperature sensor 575, the storage part 576, the display part 51 and the like as their power supply voltages.

In the control part 57 with the configuration discussed so far, an electronic signal output from the light receiving part 53 is input to the control circuit 570. The control circuit 570 performs detection and the like on the electronic signal input thereto to reproduce transmission data sent from the ESL server 10. Then the control circuit 570 decodes the reproduced transmission data and writes the same into the storage part 576. Thereafter the control circuit 570 reads the decoded transmission data from the storage part 576, acquires data contained therein indicative of a selling price, and controls the display 51 based on this data. The selling price of a corresponding product is thereby displayed on the display 51.

When transmission data is received from the distribution device 40, the control circuit 570 generates data indicating the receipt (hereinafter referred to as "ACK data") as transmission data to be sent to the distribution device 40, and encodes this transmission data according to a certain system. Then the control circuit 570 controls the light emission control switch 573 based on the encoded transmission data to control light emission at the light emission part 52. This causes the infrared signal IR2 modulated by the transmission data to the distribution device 40 to be output from the light emission part 52. At this time, the light emission part 52 uses power accumulated in the to-be-charged part 572 to emit light. That is, a forward current to flow in the LED constituting the light emission part 52 is supplied from the to-be-charged part 572. In this way, the light emission part 52 sends data using power accumulated in the to-be-charged part 572.

In the electronic shelf label 5 of the present embodiment, the to-be-charged part 572 is always charged before the ACK data is sent to the higher-order distribution device 40. The boost circuit 571 is in operation normally in the shutdown mode, and is switched from the shutdown mode to the charge mode before transmission data is output from the light emission part 52. When a certain period of time has elapsed, the operation mode of the boost circuit 571 is switched from the charge mode to the shutdown mode to complete the charging of the to-be-charged part 572. Thereafter the light emission part 52 emits light using power accumulated in the to-be-charged power 572 to output data from the light emission part 52 to the distribution device 40.

In the electronic shelf label 5 of the present embodiment, the charge operation mode includes the normal charge mode and the long-term charge mode. In the normal charge mode, the to-be-charged part 572 is charged in a relatively short period of time such as several seconds. In the long-term charge mode, by the functions of the boost circuit 571 and the control circuit 570, power supplied from the battery 56 to the to-be-charged part 572 is made lower than the normal charge mode, and the to-be-charged part 572 is charged in a relatively long period of time such as several tens of seconds.

As discussed, in the long-term charge mode, power supplied from the battery 56 to the to-be-charged part 572 is reduced, and charging takes a relatively long period of time. Thus, in response for example to a case where the internal resistance of the battery 56 increases due to operation in a low-temperature environment or performance degradation of this battery, power supplied from the battery 56 to the to-be-charged part 572 is reduced and the to-be-charged part 572 is charged in a longer period of time. This suppresses reduction of the voltage Vbat of the battery 56 caused by the increase of the internal resistance of the battery 56, while supplying a sufficient amount of power to the light emission part 52. The switching of the charge operation mode is discussed in detailed later.

Discussed next is a series of operations of the electronic shelf label system 1 by the time selling prices are displayed on the electronic shelf labels 5.

In this electronic shelf label system 1, selling prices are distributed from the distribution device 40 to the electronic shelf labels 5 at the time of system startup, at the time of update of selling prices to be displayed on the electronic shelf labels 5 and the like. Selling prices are updated when normal prices in the product master 301 are changed, when selling prices are changed from normal prices to bargain prices in preparation for special sale, and the like. At the time of system startup, selling prices relating to all products 6 in the store are distributed. At the time of update of selling prices, a selling price relating only to the product 6 targeted for update is distributed. As a result, selling prices displayed on the electronic shelf labels 5 always coincide with selling prices at the time of payment by the cash registers 270. Discussed below are operations in which selling prices of the plurality of products 6 are sequentially distributed from the distribution device 40 at the time of system startup, at the time of update of selling prices of the plurality of products 6 and the like. In the discussion below, the product 6 the selling price of which is to be distributed is referred to as a "target product 6".

Figure 9:
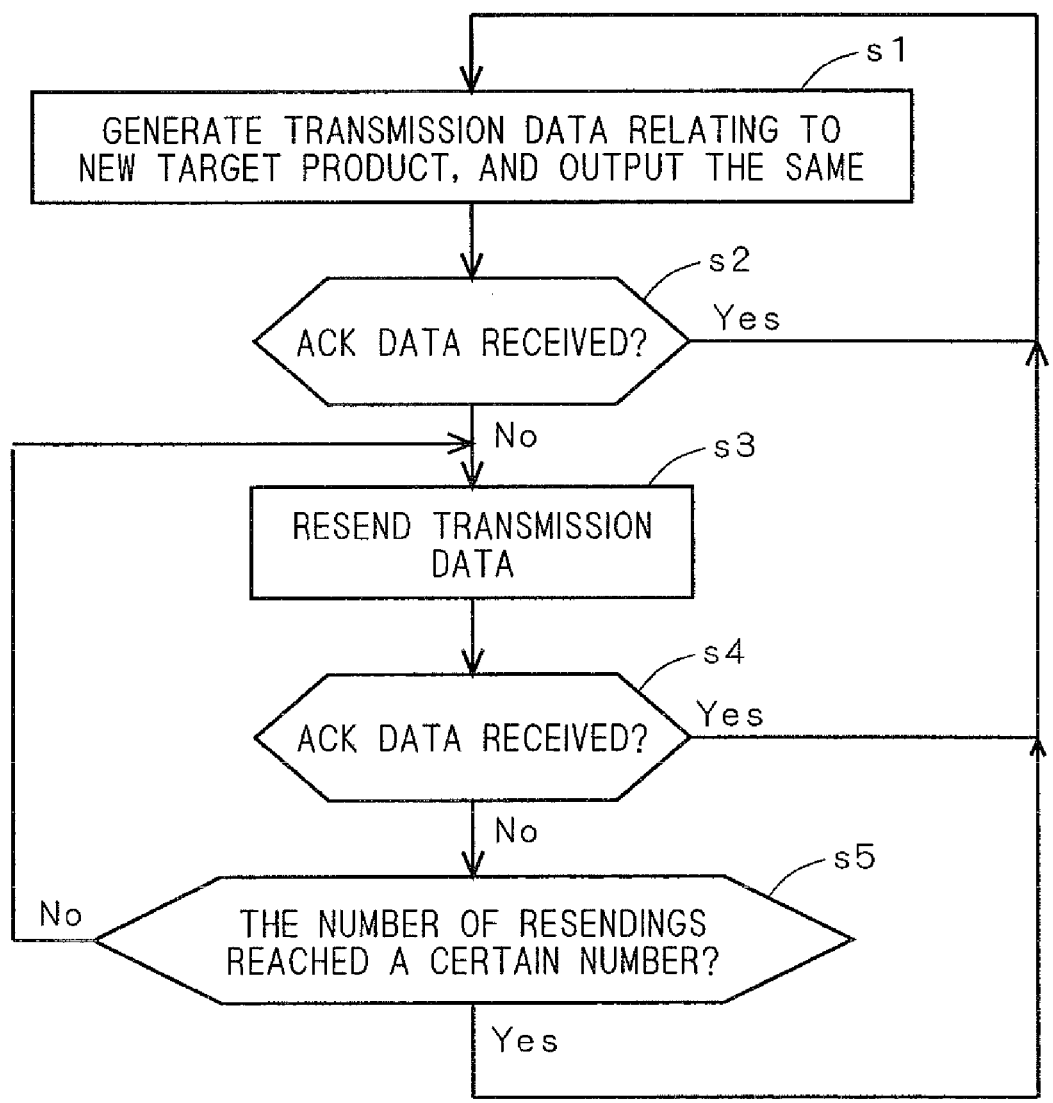
FIG. 9 is a flow chart showing the operation of the ESL server according to the embodiment of the present invention.

FIG. 9 is a flow chart showing the operation of the ESL server 10. With reference to FIG. 9, in step s1, the ESL server 10 generates transmission data containing product data relating to the target product 6, and outputs the same to each communication device 4. In step s1, the ESL server 10 first makes reference to the record 102 relating to the target product 6 in the product file 101, and acquires a selling price to be distributed that is either a normal price or a bargain price, and a device code. The device code acquired at this time is the device code of the electronic shelf label 5 corresponding to the target product 6. The acquired selling price is a selling price to be displayed on this electronic shelf label 5. Then the ESL server 10 generates transmission data containing data indicative of the acquired selling price and the device code, and outputs the same through the communication cable 22 to each communication device 4.

Next, in step s2, the ESL server 10 receives the ACK data through the communication device 4 from the electronic shelf label 5 corresponding to the target product 6. Thereafter the ESL server 10 executes step s1 again to generate transmission data relating to a next product 6, and outputs the same to each communication device 4.

Meanwhile, when the ESL server 10 does not receive the ACK data from the electronic shelf label 5 corresponding to the target product 6 within a certain period of time in step s2, the ESL server 10 resends the transmission data to this target product 6 in step s3. When the ESL server 10 receives the ACK data from the electronic shelf label 5 corresponding to the target product 6 in step s4, the ESL server 10 executes step s1 to generate transmission data relating to a next product 6, and outputs the same. When the ESL server 10 does not receive the ACK data within a certain period of time in step s4, the ESL server 10 determines in step s5 whether or not the number of executions of step s3 has reached a certain number. When the number of executions has reached the certain number, step s1 is executed. When the number of executions of step s3 has not reached the certain number, step s3 is executed again to resend the transmission data.

The ESL server 10 thereafter executes the operations in step s1 through step s5 until transmission data are output that relate to all target products 6 the selling prices of which are to be distributed.

In each communication device 4, on receipt of transmission data from the ESL server 10, the control part 41 controls the light emission part 42 based on the received transmission data. As a result, each communication device 4 outputs the infrared signal 1R1 modulated by the transmission data generated in the ESL server 10. Namely, each communication device 4 outputs transmission data generated in the ESL server 10.

Figure 10:
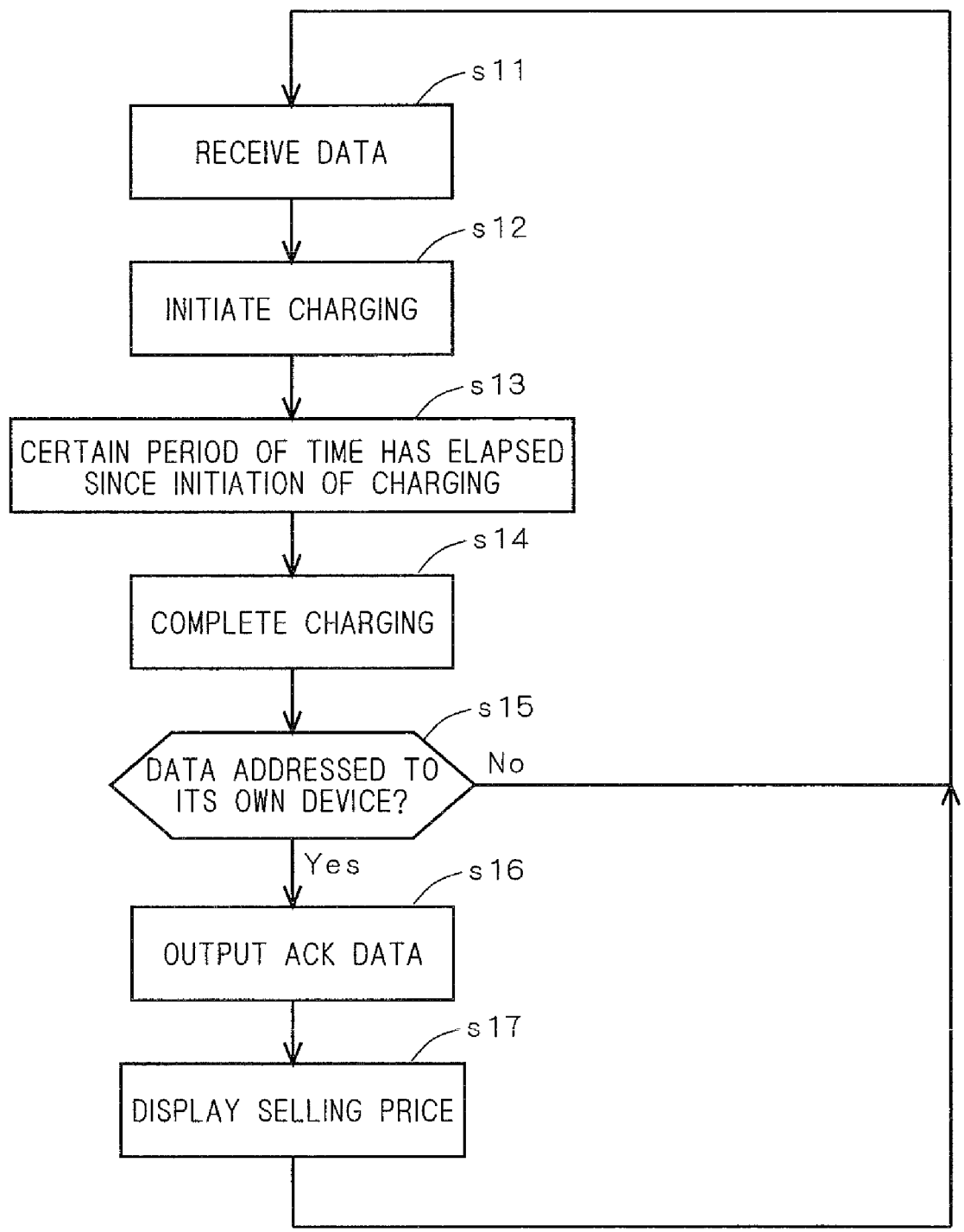
FIG. 10 is a flow chart showing the operation of the electronic shelf label according to the embodiment of the present invention.

FIG. 10 is a flow chart showing the operation of each electronic shelf label 5. As shown in FIG. 10, when each electronic shelf label 5 receives transmission data from the distribution device 40 in step s11, the control circuit 570 changes the operation mode of the boost circuit 571 from the shutdown mode to the charge mode in step s12. This initiates the charging of the to-be-charged part 572. At this time, the control circuit 570 sets the internal resistance of the boost circuit 571 according to the charge operation mode currently adopted. Namely, when the current charge operation mode is set at the normal charge mode, power supplied from the battery 56 to the to-be-charged part 572 is relatively large. When the current charge operation mode is set at the long-term charge mode, power supplied from the battery 56 to the to-be-charged part 572 is relatively small. The type of the current charge operation mode is stored in the storage part 576.

Next, when a certain period of time has elapsed from the initiation of charging of the to-be-charged part 572 in step s13, the control circuit 570 changes the operation mode of the boost circuit 571 from the charge mode to the shutdown mode to complete the charging of the to-be-charged part 572 in step s14. The certain period of time elapsed in step s13 is a period of time responsive to the current charge operation mode, and is set longer for the long-term charge mode than for the normal charge mode. As a result, a charge period is made longer in the long-term charge mode than in the normal charge mode.

When the charging of the to-be-charged part 572 is completed in step s14, the control circuit 570 determines in step s15 whether or not the received transmission data has been addressed to the electronic shelf label 5 to which the control circuit 570 belongs. More specifically, the control circuit 570 takes a device code out of the received transmission data, compares this device code with a device code of a device to which the control circuit 570 belongs and which is stored in advance in the storage part 576. When these device codes coincide with each other, the control circuit 570 determines that the received transmission data has been addressed to the device to which the control circuit 570 belongs to execute step s16. When these devices codes do not coincide with each other, the control circuit 570 determines that the received transmission data has not been addressed to the device to which the control circuit 570 belongs to complete receiving process.

In step s16, the control circuit 570 generates the ACK data, and encodes this ACK data in a certain system. Then the control circuit 570 controls the light emission control switch 573 based on the encoded ACK data to cause the infrared signal IR2 modulated by the ACK data to be output from the light emission part 52. At this time, the light emission part 52 uses power accumulated in the to-be-charged part 572 to emit light. The ACK data sent from the light emission part 52 is input to the distribution system 40, by which the ESL server 10 of the distribution device 40 is allowed to see whether or not data indicative of a "selling price" has successfully been received by the electronic shelf label 5. Accordingly, when the ACK data is not output from the electronic shelf label 5, the ESL server 10 determines that data indicative of a "selling price" has not been received successfully by the electronic shelf label 5. Then, as discussed above, the ESL server 10 is capable of repeatedly outputting data indicative of a "selling price" until the ACK data is sent thereto. This reliably updates the display on the electronic shelf label 5 to considerably enhance system reliability.

In step s17, after step s16 is executed, the control circuit 570 reads a product data out of the received transmission data, and causes a selling price indicated by this product data to be displayed on the display 51 to complete receiving process.

When new data is received in step s11 after completion of the receiving process, the electronic shelf label 5 executes the same operation.

Figure 11:
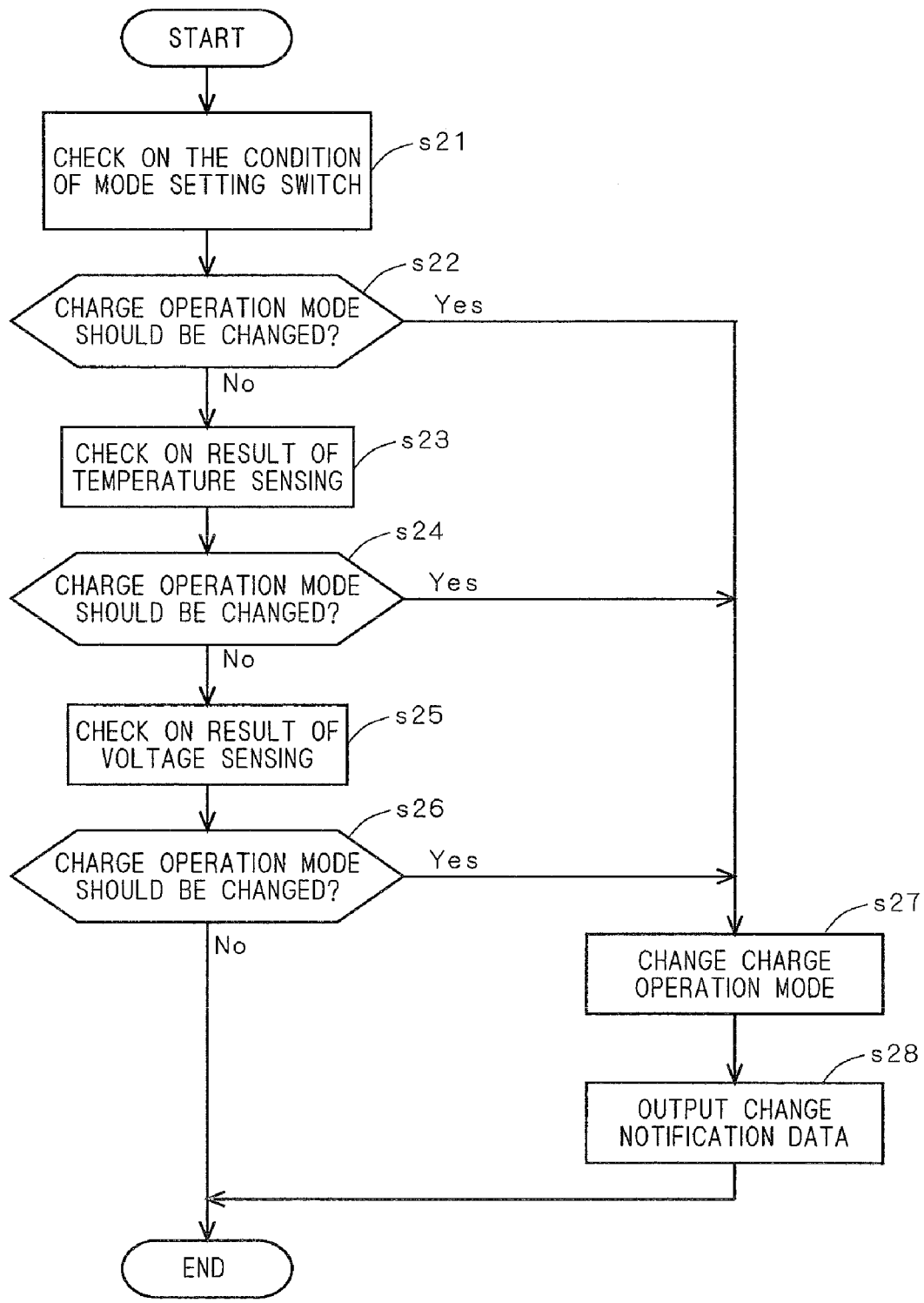
FIG. 11 is a flow chart showing the operation of the electronic shelf label according to the embodiment of the present invention.

Next, the switching process of the charge operation mode at the electronic shelf label 5 is discussed. FIG. 11 is a flow chart showing the switching process of the charge operation mode at each electronic shelf label 5. In the electronic shelf labels 5 of the present embodiment, the switching process shown in FIG. 11 is performed on a regular basis.

First, as shown in FIG. 11, the control circuit 570 checks on the condition of the mode setting switch 574 in step s21. Next, in step s22, when the charge operation mode indicated by the mode setting switch 574 is different from the current charge operation mode, the control circuit 570 determines that the charge operation mode should be changed to execute step s27.

When the charge operation mode indicated by the mode setting switch 574 is the same as the current charge operation mode, the control circuit 570 determines that no change is necessary to execute step s23.

In step s23, the control circuit 570 checks on a result of sensing at the temperature sensor 575. When the temperature of the electronic shelf label 5 to which the control circuit 570 belongs is not lower than a certain temperature, the control circuit 570 determines that the battery 56 is not operating in a low-temperature environment to decide that the normal charge mode should be employed as the charge operation mode. Meanwhile, when the temperature of the electronic shelf label 5 to which the control circuit 570 belongs is lower than the certain temperature, the control circuit 570 determines that the battery 56 is operating in a low-temperature environment to decide that the long-term charge mode should be employed as the charge operation mode. Then in step s24, the control circuit 570 compares the charge operation mode decided to be employed and the current charge operation mode. The control circuit 570 executes step s27 when these charge operation modes are different from each other, and executes step s25 when these charge operation modes coincide with each other.

In step s25, the control circuit 570 checks on a result of sensing at the voltage sensing part 570a. When the voltage Vbat from the battery 56 is not lower than a certain voltage, the control circuit 570 determines that the performance degradation of the battery 56 is not generated to decide that the normal charge mode should be employed as the charge operation mode. When the voltage Vbat from the battery 56 is lower than the certain voltage, the control circuit 570 determines that the performance degradation of the battery 56 is generated and the internal resistance thereof has increased. So the control circuit 570 decides that the long-term charge mode should be employed as the charge operation mode. Then in step s26, the control circuit 570 compares the charge operation mode decided to be employed and the current charge operation mode. The control circuit 570 executes step 27 when these charge operation modes are different from each other, and completes the process when these charge operation modes coincide with each other.

In step s27, the control circuit 570 changes the type of the current charge operation mode stored in the storage part 576. Thereafter in step s28, the control circuit 570 generates change notification data notifying that the charge operation mode has been changed, and causes the same to be output from the light emission part 52.

In the distribution device 40, when the change notification data is received from the electronic shelf label 5, the ESL server 10 changes the type of the charge operation mode of this electronic shelf label 5 to be stored in the hard disk 14. In the ESL server 10, the type of the charge operation mode of each electronic shelf label 5 is stored in the hard disk 14.

As discussed above, when the ESL server 10 does not receive the ACK data in steps s2 and s4 within a certain period of time from the electronic shelf label 5 to which the ESL server 10 has sent data, the ESL server 10 executes steps s3 and s5 respectively. According to the charge operation mode as changed, the ESL server 10 having received the change notification data changes a certain period of time employed in steps s2 and s4 with regard to the electronic shelf label 5 from which this change notification data has been sent. More specifically, the ESL server 10 sets this certain period of time with regard to the electronic shelf label 5 from which the change notification data has been sent at a relatively short period of time when the charge operation mode of this electronic shelf label 5 is set at the normal charge mode. The ESL server 10 sets this certain period of time at a relatively long period of time when the charge operation mode of this electronic shelf label 5 is set at the long-term charge mode. This is because, in the electronic shelf label 5, the long-term charge mode takes a longer period of time from the receipt of data from the distribution device 40 to the transmission of the ACK data than the normal charge mode. Thus, the ESL server 10 is allowed to precisely determine whether or not data has successfully been received by the electronic shelf label 5 irrespective of the charge operation mode at this electronic shelf label 5.

As discussed, in the electronic shelf label 5 of the present embodiment, the charge operation mode is switched based on the condition of the mode setting switch 574. Thus the electronic shelf label 5 is allowed to easily switch the charge operation mode alone.

In the electronic shelf label 5 of the present embodiment, the charge operation mode is switched based on a result of sensing at the temperature sensor 575 for sensing the temperature of this electronic shelf label 5. Thus, the charge operation mode can be reliably set at the long-term charge mode when the battery 56 operates in a low-temperature environment. As a result, even if the battery 56 operates in a low-temperature environment to increase its internal resistance, the reduction of the voltage Vbat of the battery 56 during charging can be reliably suppressed.

In the electronic shelf label 5 of the present embodiment, the charge operation mode is switched based on a result of sensing at the voltage sensing part 570a for sensing the voltage Vbat of the battery 56. Thus, the charge operation mode can be reliably set at the long-term charge mode when the performance degradation of the battery 56 is generated to increase its internal resistance. As a result, even if the performance degradation of the battery 56 is generated to increase its internal resistance, the reduction of the voltage Vbat of the battery 56 during charging can be reliably suppressed.

As discussed above, in the electronic shelf label system 1 of the present embodiment, the electronic shelf label 5 is allowed to easily switch its charge operation mode alone. In this electronic shelf label system 1, the distribution device 40 is also allowed to change the charge operation mode of each electronic shelf label 5. In the below, it is discussed in detail how the electronic shelf label system 1 operates when the distribution system 40 changes the charge operation mode of the electronic shelf label 5. In the discussion below, the electronic shelf label 5 targeted for the change of the charge operation mode is referred to as a "target electronic shelf label 5".

Figure 12:
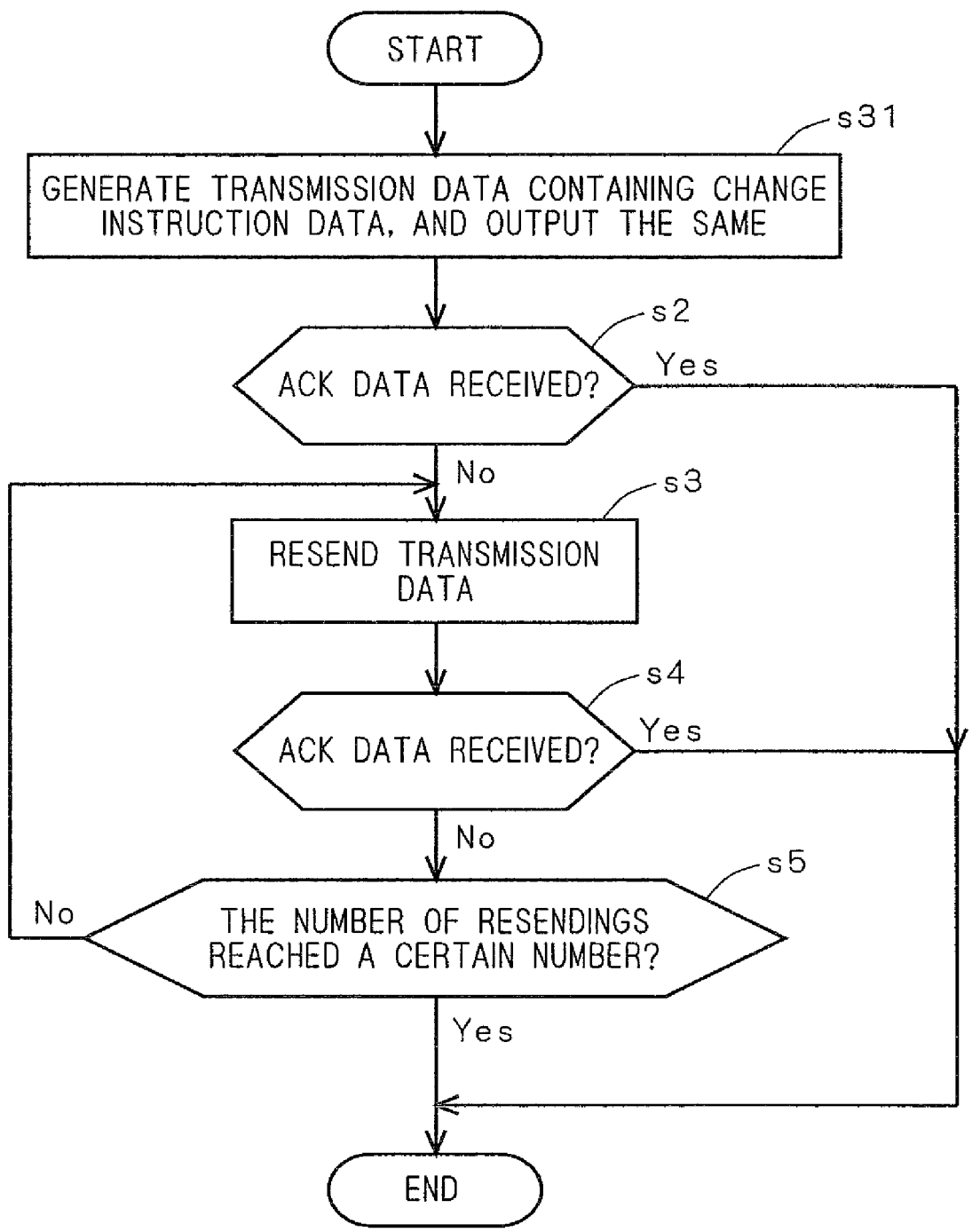
FIG. 12 is a flow chart showing the operation of the ESL server according to the embodiment of the present invention.

FIG. 12 is a flow chart showing the operation of the ESL server 10 when the charge operation mode of the electronic shelf label 5 is changed. As shown in FIG. 12, in step s31, the ESL server 10 generates transmission data containing change instruction data giving instructions to change the charge operation mode and data indicative of a device code of the target electronic shelf label 5, and outputs the same through the communication cable 22 to each communication device 4. Like in the above-mentioned flow chart shown in FIG. 9, steps s2 through s5 discussed above are executed after the execution of step s31. Each communication device 4 converts the transmission data input from the ESL server 10 into the infrared signal IR1, and outputs the same.

The ESL server 10 checks on the location of each electronic shelf label 5 at the time of system startup, and defines the electronic shelf label 5 arranged in a low-temperature area in the store 200 as the target electronic shelf label 5. In the present embodiment, the low-temperature area means a refrigerator area and a freezer area in the store 200. When the electronic shelf label 5 is attached either to the showcase 230 in which meat and fish are placed or to the showcase 250 in which frozen foods and ice creams are placed, this electronic shelf label 5 is arranged in the low-temperature area. The charge operation mode of each electronic shelf label 5 is set at the normal charge mode in its initial state. Accordingly, the charge operation mode of each electronic shelf label 5 is set at the normal charge mode at the time of system startup. Thus the electronic shelf label 5 arranged in the low-temperature area in the store 200 is defined as the target electronic shelf label 5 at the time of system startup. The location of each electronic shelf label 5 is stored in the product file 101 in association with a device code.

When the location of the electronic shelf label 5 is changed to a location in the low-temperature area in the store 200, the ESL server 10 checks on the current charge operation mode of this electronic shelf label 5. When the current charge operation mode is the normal charge mode, the ESL server 10 defines this electronic shelf label 5 as the target electronic shelf label 5. When each electronic shelf label 5 changes the charge operation mode by itself, each electronic shelf label 5 notifies the ESL server 10 of this change. Thus the ESL server 10 is allowed to see the current charge operation mode of each electronic shelf label 5 even if the electronic shelf label 5 changes the charge operation mode by itself.

The ESL server 10 checks on the number of communications made with each electronic shelf label 5 so far on a regular basis. When the number of communications has reached or exceeded a certain number, the ESL server 10 determines that the performance degradation of the electronic shelf label 5 is generated and checks on the current charge operation mode of this electronic shelf label 5. When the current charge operation mode is the normal charge mode, the ESL server 10 defines this electronic shelf label 5 as the target electronic shelf label 5. Here, the number of communications may be the number of times the ACK data has been received from the electronic shelf label 5, or may be the number of times transmission data has been sent to the electronic shelf label 5. The ESL server 10 stores the number of communications with each electronic shelf label 5 in the hard disk 14.

Instead of changing the charge operation mode of the electronic shelf label 5 based on the number of communications with this electronic shelf label 5, the ESL server 10 may change the charge operation mode of the electronic shelf label 5 based on the operating period of this electronic shelf label 5 from a certain point in time. As an example, in the ESL server 10 of the present embodiment, an operating period of each electronic shelf label 5, which starts from a point in time at which a selling price has been distributed to each electronic shelf label 5 at the time of system startup, is stored in the hard disk 14. When this operating period has reached or exceeded a certain period, the ESL server 10 determines that the performance degradation of each electronic shelf label 5 is generated. Then the ESL server 10 checks on the current charge operation mode of each electronic shelf label 5, and defines the electronic shelf label 5 in the normal charge mode as the target electronic shelf label 5.

The ESL server 10 may send change notification data together with product data to the electronic shelf labels 5.

Figure 13:
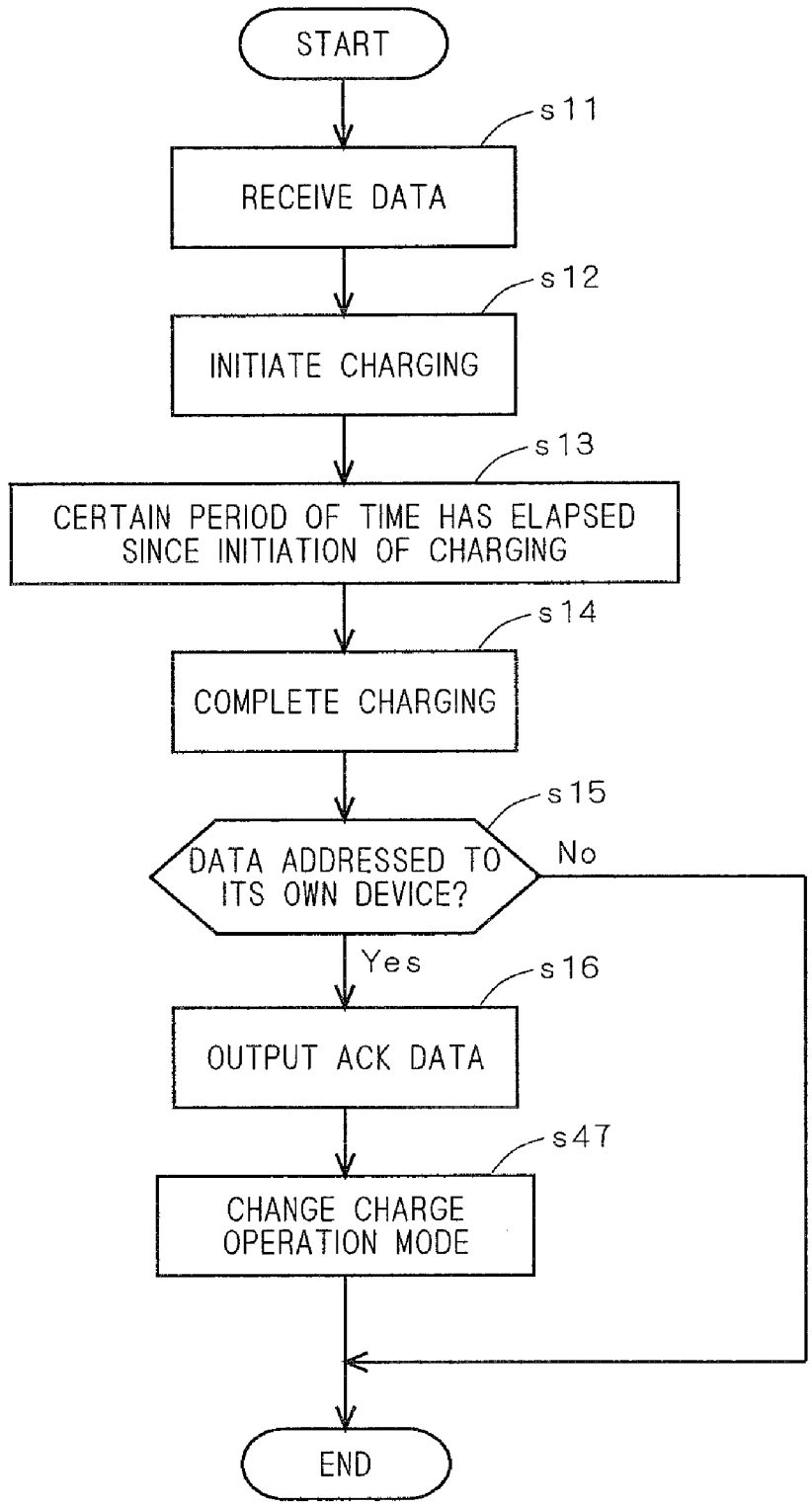
FIG. 13 is a flow chart showing the operation of the electronic shelf label according to the embodiment of the present invention.

FIG. 13 is a flow chart showing the operation of each electronic shelf label 5 when the change notification data is input from the distribution device 40. Like in the above-mentioned flow chart shown in FIG. 10, each electronic shelf label 5 sequentially executes steps s11 through s15 as shown in FIG. 13.

When the control circuit 570 determines in step s15 that the received transmission data has been addressed to a device to which the control circuit 570 belongs, the control circuit 570 executes the above-mentioned step s16. When the control circuit 570 determines that the received transmission data has not been addressed to the device to which the control circuit 570 belongs, the control circuit 570 completes receiving process.

After step s16 is executed, the control circuit 570 checks on the change notification data contained in the received transmission data, and changes the type of the charge operation mode stored in the storage part 576 from the normal charge mode to the long-term charge mode. Thus, in this electronic shelf label 5, an operation mode for next charging of the to-be-charged part 572 is set at the long-term charge mode. Thereafter receiving process is completed.

As discussed, on receipt of the change notification data from the distribution device 40, the charge operation mode is switched in each electronic shelf label 5 from the normal charge mode to the long-term charge mode in which power supplied from the battery 56 to the to-be-charged part 572 is lower than that in the normal charge mode, and a period for charging the to-be-charged part 572 is longer than that in the normal charge mode. Thus, in response for example to a case where the internal resistance of the battery 56 increases due to operation in a low-temperature environment or performance degradation of this battery 56, power supplied from the battery 56 to the to-be-charged part 572 is reduced and the to-be-charged part 572 is charged in a longer period of time under instructions from the distribution device 40. This suppresses reduction of the voltage Vbat of the battery 56 caused by the increase of the internal resistance of the battery 56, while maintaining power supplied to the light emission part 52 operative to serve as a transmission part. As a result, malfunctions of the electronic shelf labels 5 are suppressed while transmission performance is maintained.

In the present embodiment, power is supplied from the battery 56 to the to-be-charged part 572 through the boost circuit 571. When power from the battery 56 is supplied to the to-be-charged part 572 through the boost circuit 571, higher power should be taken out of the battery 56, causing the voltage Vbat of the battery 56 to easily drop during operation in a low-temperature environment or on the occurrence of performance degradation of this battery 56. The present invention may be effectively applied especially in this case.

In the present embodiment, the distribution device 40 determines whether or not the change notification data should be sent to the electronic shelf label 5 based on the location of this electronic shelf label 5. When the electronic shelf label 5 is arranged at a place in low ambient temperature such as a refrigerator area or a freezer area in the store 200, the distribution device 40 sends the change notification data to this electronic shelf label 5 to change the charge operation mode of this electronic shelf label 5. It is thus possible to properly suppress the reduction of the voltage Vbat of the battery 56 caused by the increase of internal resistance during operation in a low-temperature environment.

In the present embodiment, the distribution device 40 determines whether or not the change notification data should be sent to the electronic shelf label 5 based on the number of communications with this electronic shelf label 5, or on the operating period of this electronic shelf label 5 from a certain point in time. Thus the distribution device 40 sends the change notification data to the electronic shelf label 5 at a point in time at which performance degradation is assumed to be generated in the battery 56 of this electronic shelf label 5, thereby changing the charge operation mode of this electronic shelf label 5. It is thus possible to properly suppress the reduction of the voltage Vbat of the battery 56 caused by the increase of internal resistance on the occurrence of performance degradation.

While the invention has been shown and described in detail, the foregoing description is in all aspects illustrative and not restrictive. It is therefore understood that numerous modifications and variations can be devised without departing from the scope of the invention.

The invention claimed is:

1. An electronic shelf label system comprising:
   a plurality of electronic shelf labels arranged in corresponding relation to products, and displaying product data relating to corresponding products; and
   an information distribution part for making communication with said plurality of electronic shelf labels to distribute said product data to each of said plurality of electronic shelf labels on which said product data should be displayed,
   each of said plurality of electronic shelf labels including:
      a battery for supplying power of this electronic shelf label;
      a to-be-charged part to be charged by power supplied from said battery;
      a transmission part for sending data to said information distribution part by using power accumulated in said to-be-charged part; and
      a charge control part for controlling power supplied from said battery to said to-be-charged part,
   in each of said plurality of electronic shelf labels, on receipt of certain data from said information distribution part, a charge operation mode of the respective electronic shelf label being changed is selected from one of two predetermined modes based on said certain data a first mode in which said to-be-charged part is charged in a first period of time and a second mode in which said to-be-charged part is charged in a second period of time longer than said first period of time, power supplied from said battery to said to-be-charged part being lower in said second mode than in said first mode.

2. The electronic shelf label system according to claim 1, wherein said charge control part includes a boost circuit for boosting the voltage of said battery and supplying the voltage to said to-be-charged part, and power is supplied from said battery through said boost circuit to said to-be-charged part.

3. The electronic shelf label system according to claim 1, wherein said information distribution part determines whether or not said information distribution part should send said certain data to said electronic shelf label based on the location of this electronic shelf label.

4. The electronic shelf label system according to claim 1, wherein said information distribution part determines whether or not said information distribution part should send said certain data to said electronic shelf label based on the number of communications with this electronic shelf label.

5. The electronic shelf label system according to claim 1, wherein said information distribution part determines whether or not said information distribution part should send said certain data to said electronic shelf label based on the operating period of this electronic shelf label from a certain point in time.

6. The electronic shelf label system according to claim 1, wherein each of said plurality of electronic shelf labels further includes a mode setting switch, and each of said plurality of electronic shelf labels switches said charge operation mode in response to the condition of said mode setting switch.

7. The electronic shelf label system according to claim 1, wherein each of said plurality of electronic shelf labels further includes a temperature sensor for sensing the temperature of this electronic shelf label, and each of said plurality of electronic shelf labels switches to the first mode when the temperature sensed by said temperature sensor is equal to or higher than a predetermined temperature and switches to the second mode when the temperature sensed by the temperature sensor is lower than the predetermined temperature.

8. The electronic shelf label system according to claim 1, wherein each of said plurality of electronic shelf labels further includes a voltage sensing part for sensing the voltage of said battery, and each of said plurality of electronic shelf labels switches to the first mode when the voltage sensed by said voltage sensing part equal to or greater than a predetermined voltage and switches to the second mode when the voltage sensed by said voltage sensing part is less than the predetermined voltage.

* * * * *

UNITED STATES PATENT AND TRADEMARK OFFICE
CERTIFICATE OF CORRECTION

PATENT NO. : 8,258,921 B2  Page 1 of 1
APPLICATION NO. : 12/302992
DATED : September 4, 2012
INVENTOR(S) : Nobuki Hashiguchi et al.

It is certified that error appears in the above-identified patent and that said Letters Patent is hereby corrected as shown below:

Column 7, Line 54, Delete "1R2" and insert -- IR2 --, therefor.
Column 11, Line 47, Delete "1R1" and insert -- IR1 --, therefor.

Signed and Sealed this
Sixth Day of November, 2012

David J. Kappos
*Director of the United States Patent and Trademark Office*